United States Patent
Chandrashekhara et al.

(10) Patent No.: US 12,530,120 B2
(45) Date of Patent: Jan. 20, 2026

(54) MAXIMIZING DATA MIGRATION BANDWIDTH

(71) Applicant: Dell Products L.P., Round Rock, TX (US)

(72) Inventors: Sandeep Chandrashekhara, Shrewsbury, MA (US); Ramesh Doddaiah, Westborough, MA (US); Mohammed Asher, Bangalore (IN); Mark Halstead, Holliston, MA (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/230,265

(22) Filed: Aug. 4, 2023

(65) Prior Publication Data
US 2025/0044944 A1 Feb. 6, 2025

(51) Int. Cl.
*G06F 3/06* (2006.01)

(52) U.S. Cl.
CPC .......... *G06F 3/0611* (2013.01); *G06F 3/0647* (2013.01); *G06F 3/067* (2013.01)

(58) Field of Classification Search
CPC .............................. G06F 3/0611; G06F 3/0647
See application file for complete search history.

(56) References Cited

U.S. PATENT DOCUMENTS

| | | | |
|---|---|---|---|
| 7,475,130 B2* | 1/2009 | Silverman | H04L 43/08 709/224 |
| 10,791,168 B1* | 9/2020 | Dilley | H04L 67/288 |
| 2018/0121111 A1* | 5/2018 | Swallow | G06F 11/2025 |
| 2022/0191306 A1* | 6/2022 | Radi | H04L 69/163 |
| 2022/0368646 A1* | 11/2022 | Vedam | H04L 43/0864 |

* cited by examiner

*Primary Examiner* — Jason W Blust
(74) *Attorney, Agent, or Firm* — Krishnendu Gupta; Nikhil Patel

(57) ABSTRACT

One or more aspects of the present disclosure relate to maximizing data migration bandwidth. In embodiments, one or more network characteristics corresponding to network communications between a first storage array and a second storage array is determined. Further, one or more network metrics of at least one acknowledgment communication from the second storage array to the first storage array can be analyzed. Additionally, one or more input/output (IO) messages are transmitted from the first storage array to the local storage array during an acknowledgment period corresponding to receipt of the at least one acknowledgment communication from the second storage array by the first storage array based on the one or more network metrics.

20 Claims, 4 Drawing Sheets

MAXIMIZING DATA MIGRATION BANDWIDTH

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to maximizing data migration bandwidth. In embodiments, one or more network characteristics corresponding to network communications between a first storage array and a second storage array is determined. Further, one or more network metrics of at least one acknowledgment communication from the second storage array to the first storage array can be analyzed. Additionally, one or more input/output (IO) messages are transmitted from the first storage array to the local storage array during an acknowledgment period corresponding to receipt of the at least one acknowledgment communication from the second storage array by the first storage array based on the one or more network metrics.

In embodiments, a bandwidth corresponding to the one or more network characteristics of the network communications between the first storage array and the second storage array can be determined.

In embodiments, a latency corresponding to the one or more network characteristics of the network communications between the first storage array and the second storage array can be determined.

In embodiments, an impact of network distance between the first storage array and the second storage array on the latency can be determined.

In embodiments, the network distance between the first storage array and the second storage array can be determined based on a round-trip time (RTT) of the one or more IO messages.

In embodiments, bandwidth utilization during a future acknowledgment period can be predicted. Additionally, an available bandwidth capacity during the future acknowledgment period can be determined based on the utilization of the bandwidth.

In embodiments, a set of IO messages to fill a portion of the available bandwidth capacity can be generated during the future acknowledgment period. Further, the set of IO messages can be transmitted from the first storage array to the second storage array during the future acknowledgment period.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

The business can sometimes establish a storage area network (SAN) with a first and second storage array. For example, the first storage array (e.g., local storage array) can reside at an office of the business as a primary device that manages the office's data. Additionally, the business can configure the second storage array for data backup. Accordingly, the second storage array can be located physically remote from the local storage array.

In embodiments, the local storage array can back up its data by sending IO messages to the remote storage array. For example, the local storage array can send copies of IO write requests it receives from one or more hosts (e.g., hosts 106 of FIG. 1) to the remote storage array. In response to receiving the copies, the remote storage array can transmit a confirmation or acknowledgment (e.g., completion) message to the local storage array. The completion messages can inform the local storage array that the remote storage array has successfully received and processed corresponding copy IO messages.

While the local storage array is receiving and waiting for the completion messages (e.g., an acknowledgment period), current naïve approaches pause the local storage array's transmissions of copy IO messages. Because confirmation or acknowledgment messages are small (e.g., less than a threshold size), the current naïve approaches do not maximize the bandwidth of a communications link/channel between the local and remote storage arrays during the completion period.

Embodiments of the present disclosure dynamically open copy jobs (e.g., transmissions of copy IO messages) during the completion period. Thus, the embodiments advantageously leverage the underutilized bandwidth of the communication link between the local and remote storage arrays during the completion period.

Figure 1:
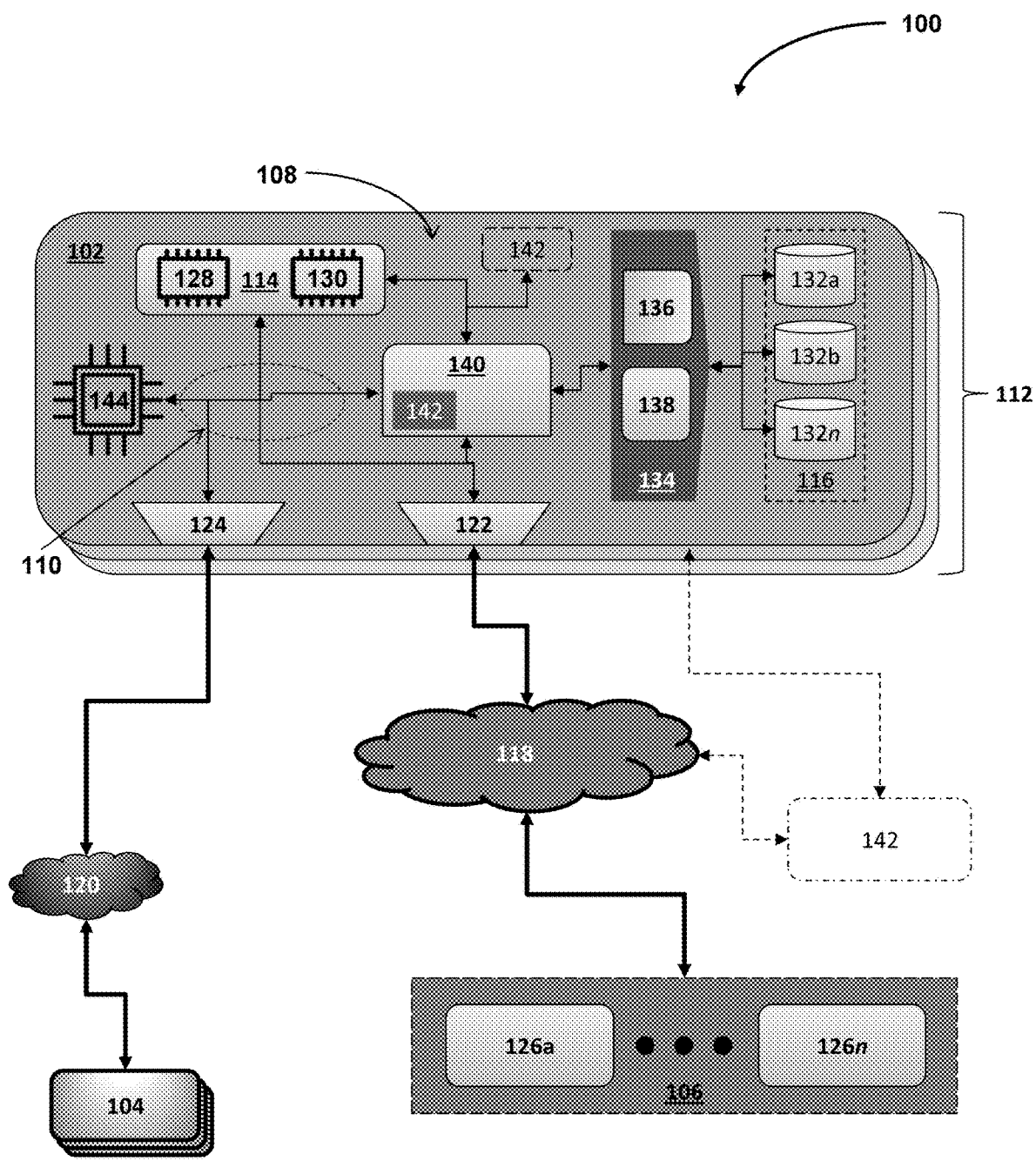
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network (RN) 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
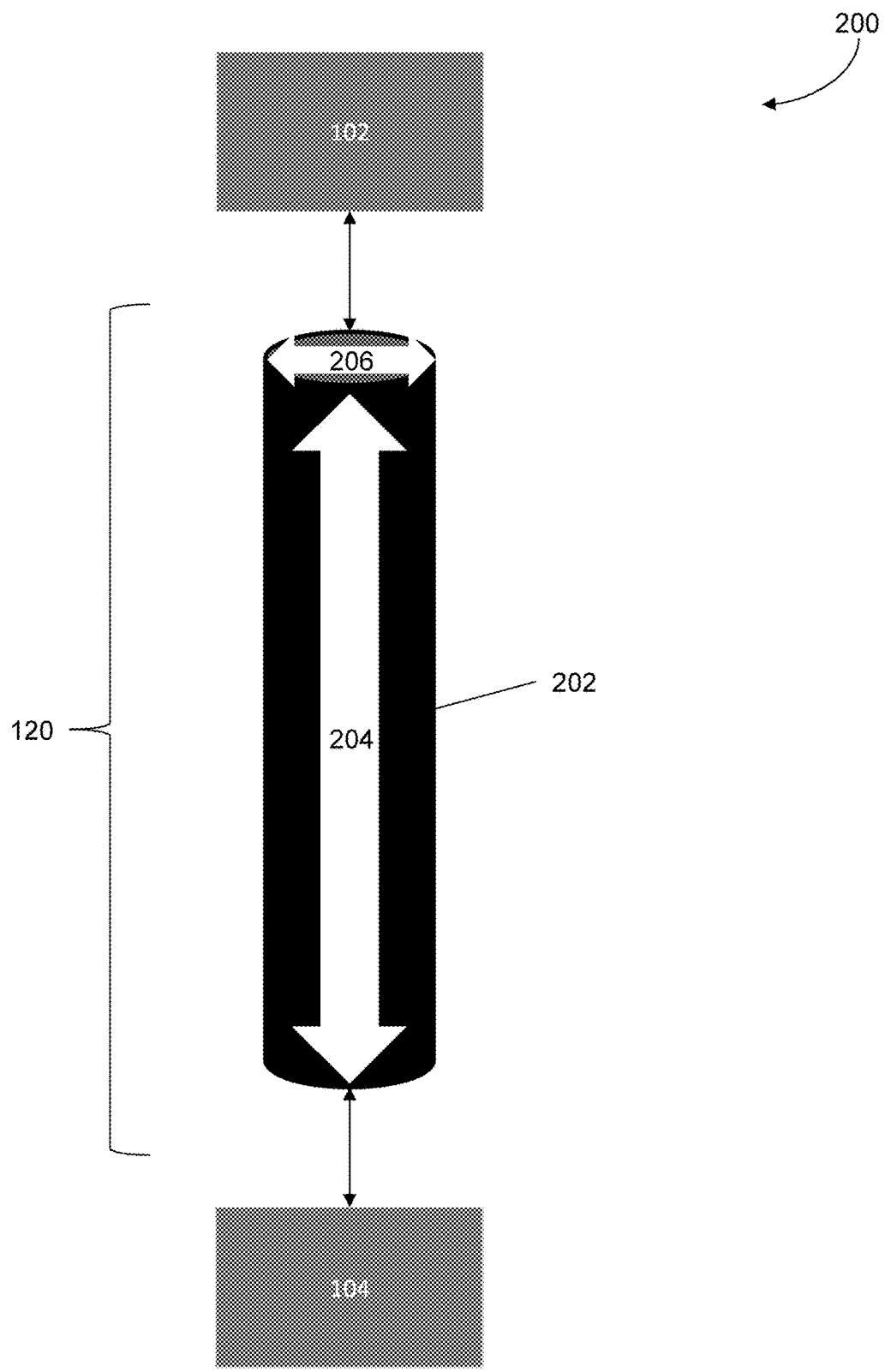
FIG. 2 illustrates a communication channel between networked devices in accordance with embodiments of the present disclosure.

Regarding FIG. 2, a distributed network environment 200 can include a first (e.g., local) storage array 102 and a second (e.g., remote) storage array 104. In embodiments, the local storage array 102 and the remote storage array 104 can connect to a remote network (RN) 120. Additionally, a communications channel 202 can communicatively couple the local storage array 102 and the remote storage array 104. For example, the local storage array 102 can establish the communications channel 202 using a network communications protocol. Further, the communications channel 202 can include one or more network characteristics that affect network communications between the local and remote storage arrays 102/104. The network characteristics can correspond to bandwidth 206, latency 204, throughput, and the like.

For example, the bandwidth (e.g., network bandwidth) 206 can correspond to a capacity of a communications link (e.g., the communications channel 202) to transmit a maximum amount of data from one point (e.g., the local storage array 102) to a second point (e.g., the remote storage array 104) over a network (e.g., the RN 120) in a given amount of time. In other words, the bandwidth 206 represents the maximum capabilities of a network rather than an actual transfer rate (e.g., throughput).

Further, the latency (e.g., network latency) 204 can correspond to the delay in network communications. Specifically, the latency 204 can correspond to the time data takes to transfer across the RN 120 (e.g., from the local storage array 102 to the remote storage array 104, or vice-versa). In embodiments, network characteristics like transmission medium, distance, number of network hops, data volume, device performance, propagation delay, serialization delay, and the like can contribute to the latency 204.

Figure 3:
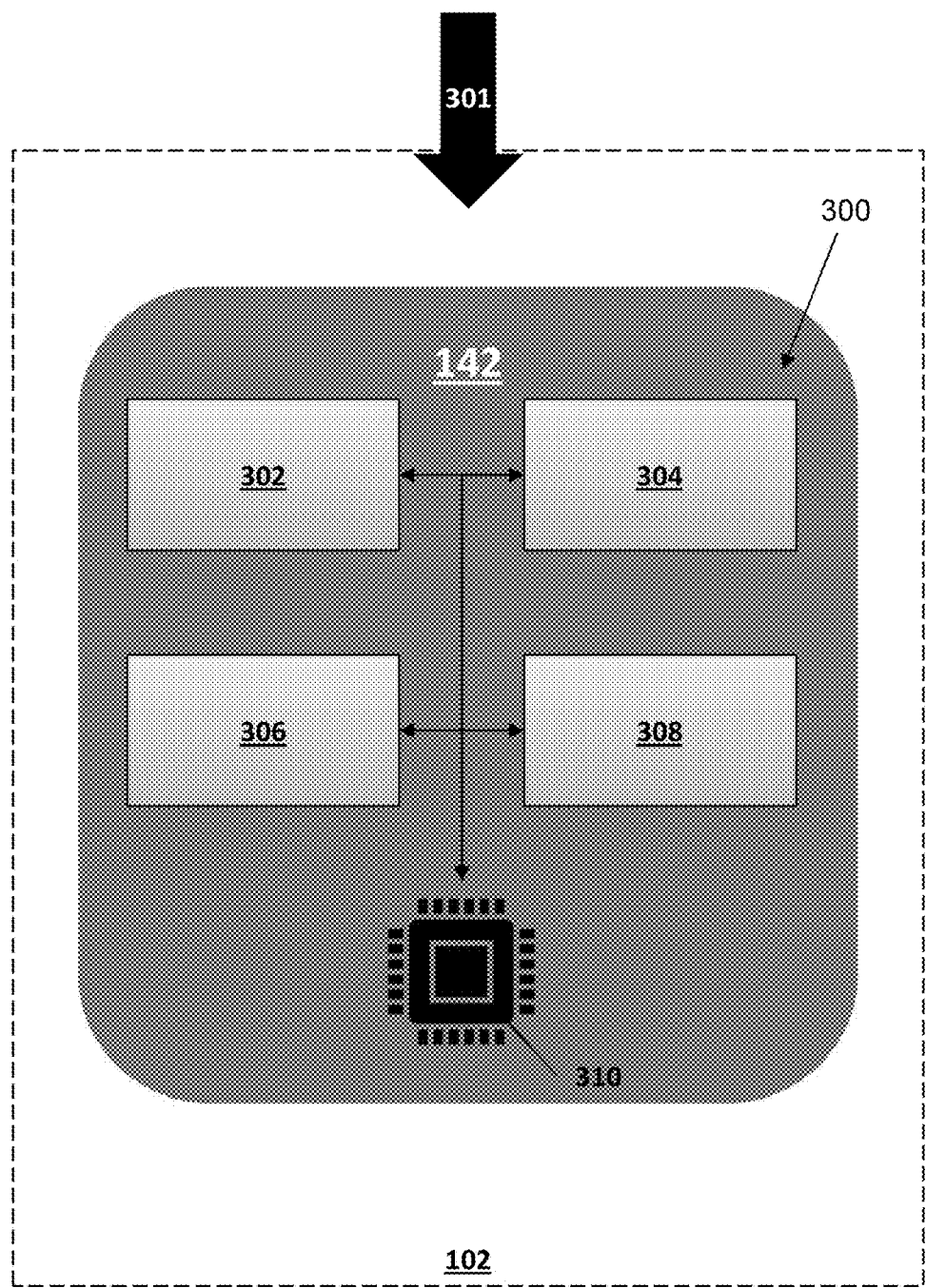
FIG. 3 is a block diagram of a controller in accordance with embodiments of the present disclosure.

Regarding FIG. 3, a storage array 102 can receive an input/output (IO) workload 301, including one or more IO requests. The IO workload 301 can include IO read/write requests issued by one or more hosts (e.g., hosts 106 of FIG. 1). In embodiments, the storage array 102 can include a controller 142 with hardware, circuitry, or logical elements 300 that perform at least one more data storage services. For example, the controller 142 can perform data migration (e.g., data backup) operations.

In embodiments, the controller 142 can also include a network analyzer 302 with logic, hardware, and circuitry that analyzes a communication link (e.g., communication channel 202 of FIG. 2) between the storage array 102 and another networked device (e.g., a remote system 104 of FIG. 2). For instance, the network analyzer 302 can measure network metrics corresponding to the communication link and corresponding IO messages transmitted to/from the storage array 102 and the other networked device. The network metrics can include bandwidth, throughput, latency, distance, round trip time (RTT), remote array processing time, etc.

In embodiments, the network analyzer 302 can determine the communication link's bandwidth (e.g., the bandwidth 206 of FIG. 2). For example, the network analyzer 302 can receive or request information corresponding to the bandwidth from an Internet service provider (ISP) (not shown). In other examples, the network analyzer 302 can analyze IO messages of varying sizes transmitted over the communications link to determine the bandwidth.

In addition, the network analyzer 302 can analyze the transmitted IO messages to measure the network metrics corresponding to the communications link. The network analyzer 302 can also record the network metric measurements in a measurement log stored in the local memory 310. For example, the network analyzer 302 can analyze metadata from one or more response messages (e.g., completion messages) from the remote system to determine the average latency of the communications link. Each response message's metadata can include temporal information corresponding to their corresponding IO messages (e.g., copy IO messages) and the response message itself. Using the temporal information, the network analyzer 302 can calculate the communication link's current and average latency, throughput, RTT, remote array processing time, etc.

Further, the network analyzer 302 can calculate the communication link's length using the communication link's current and average latency, throughput, RTT, remote array processing time, etc. The length can correspond to the distance (e.g., network distance) between the storage array and the remote system. Thus, the network analyzer 302 can determine the distance's impact on the communication link's current and average latency. Further, the network analyzer 302 can maintain a network characteristics data structure (e.g., look-up table), identifying each of the storage array's communication links to remote devices with distances greater than a threshold distance or with distances that impact their corresponding latency greater than a threshold impact.

In embodiments, the controller 142 can include an IO processor 304, including logic, hardware, and circuitry that process the IO workload 301. For example, the IO processor 304 can identify one or more characteristics corresponding to the IO workload 302 and its corresponding IO messages. The characteristics include IO types, sizes, access patterns, thread counts, read/write ratios, etc. Further, the IO processor 304 can identify patterns corresponding to historical or current IO workloads and their corresponding IO messages. Based on the patterns, the IO processor 304 can maintain at least one workload model defining and anticipating the characteristics of one or more future IO workloads and their corresponding IO messages in a local memory 310.

In embodiments, the controller 142 can further include a scheduler 306 with logic, hardware, and circuitry that manage data migration (e.g., copy or backup) operations. For example, the scheduler 306 can analyze each IO workload model and the measurements log stored in the local memory 310 to maintain a data migration schedule in the local memory 310. Further, the scheduler 306 can identify a first window (T1) to generate copy jobs (e.g., copy IO messages) corresponding to IO write requests of the IO workload 301. Based on the analyses/calculations of the network analyzer 302 and the measurements log, the scheduler 306 can define a second window (T2) identifying a duration corresponding to the time required for all copy IOs corresponding to the copy jobs generated during T1 to reach the remote system. Additionally, the scheduler 306 can define a third window (T3) identifying a duration corresponding to the time required by the remote system to process the copy IOs transmitted/received during T1/T2 and the time required for all the completion messages corresponding to the copy IOs to reach the storage array from the remote system.

In embodiments, the controller 142 can also include a data migration processor 308, including logic, hardware, and circuitry configured to perform data migration services. For instance, the data migration processor 308 can obtain the data migration schedule for a communication link (e.g., the communications channel 202 of FIG. 2) to perform the data migration services. Using the data migration schedule, the data migration processor 308 can generate copy IO jobs for each IO write request in the IO workload 301 during T1. Specifically, the data migration processor 308 can generate copy IO jobs with IO characteristics (e.g., size, etc.) that utilize a significant portion of the communication link's bandwidth (e.g., the bandwidth 206 of FIG. 1). Further if the communication link's distance is greater than a distance threshold, the data migration processor 308 can generate additional copy jobs to transmit copy IOs during T3. For example, the data migration processor 308 can determine the capacity of the communication link's bandwidth used by the completion messages during T3.

Additionally, the data migration processor 308 can determine the available capacity of the communication link's bandwidth during T3 based on the bandwidth and its used capacity. Further, the data migration processor 308 can generate additional IO copy jobs with IO characteristics to utilize a significant portion of the available capacity during T3. Thus, the data migration processor 308 can transmit the additional IO messages corresponding to the copy jobs to the remote system during T3.

The following text includes details of a method(s) or a flow diagram(s) per embodiments of this disclosure. Each method is depicted and described as a set of alterable operations for simplicity of explanation. Additionally, one or more operations can be performed in parallel, concurrently, or in a different sequence. Further, not all the illustrated operations are required to implement each method described by this disclosure.

Figure 4:
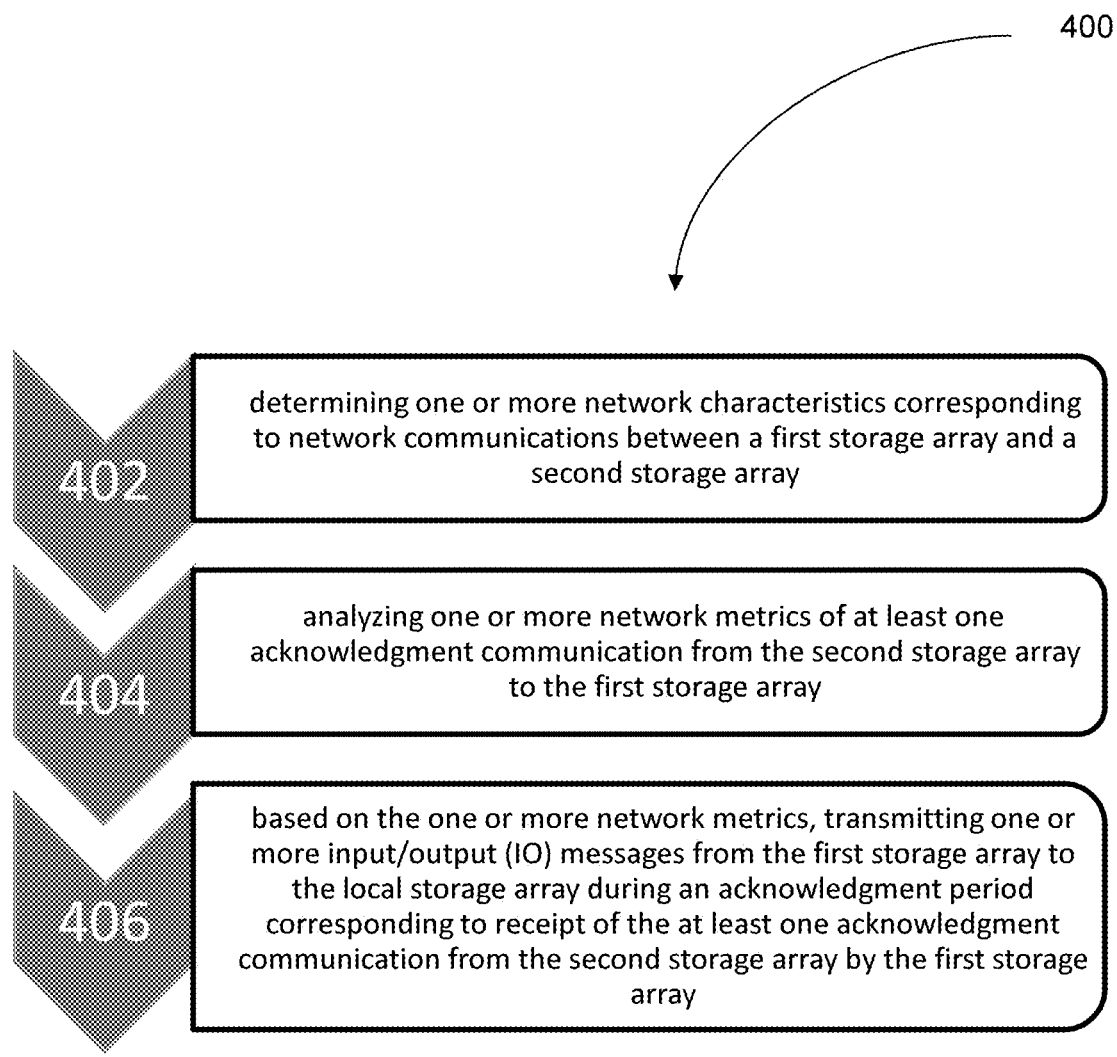
FIG. 4 is a flow diagram of a method for maximizing data migration bandwidth per embodiments of the present disclosure.

Regarding FIG. 4, a method 400 relates to maximizing data migration bandwidth. In embodiments, the controller 142 of FIG. 1 can perform all or a subset of operations corresponding to the method 400.

For example, the method 400, at 402, can include determining one or more network characteristics corresponding to network communications between a first and second storage array. Additionally, at 404, the method 400 can include analyzing one or more network metrics of at least one acknowledgment communication from the second storage array to the first storage array. Further, based on the one or more network metrics, the method 400, at 406, can include transmitting one or more input/output (IO) messages from the first storage array to the local storage array during an acknowledgment period corresponding to receipt of the at least one acknowledgment communication from the second storage array by the first storage array.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   determining one or more network characteristics corresponding to network communications between a first storage array and a second storage array;
   analyzing one or more network metrics of at least one acknowledgment communication from the second storage array to the first storage array; and
   based on the one or more network metrics, transmitting one or more input/output (IO) messages from the first storage array to the second storage array during an acknowledgment period corresponding to receipt of the at least one acknowledgment communication from the second storage array by the first storage array, wherein the transmitting utilizes available bandwidth capacity of a communication channel between the first storage array and the second storage array during the acknowledgment period that would otherwise remain unused while awaiting the at least one acknowledgment communication,
   wherein the transmitting includes:
       monitoring bandwidth utilization of the communication channel during the acknowledgment period,
       identifying unused bandwidth capacity that remains available while waiting for acknowledgment communications, and
       dynamically generating and transmitting additional IO messages specifically sized to utilize the identified unused bandwidth capacity without interfering with acknowledgment communications.

2. The method of claim 1, further comprising:
   determining a bandwidth corresponding to the one or more network characteristics of the network communications between the first storage array and the second storage array.

3. The method of claim 1, further comprising:
   determining a latency corresponding to the one or more network characteristics of the network communications between the first storage array and the second storage array.

4. The method of claim 3, further comprising:
   determining an impact of network distance between the first storage array and the second storage array on the latency.

5. The method of claim 4, further comprising:
   determining the network distance between the first storage array and the second storage array based on a round-trip time (RTT) of the one or more IO messages.

6. The method of claim 2, further comprising:
   predicting a utilization of the bandwidth during a future acknowledgment period; and
   determining an available bandwidth capacity during the future acknowledgment period based on the utilization of the bandwidth.

7. The method of claim 6, further comprising:
   generating a set of IO messages to fill a portion of the available bandwidth capacity during the future acknowledgment period; and
   transmitting the set of IO messages from the first storage array to the second storage array during the future acknowledgment period.

8. An apparatus with a memory and processor, the apparatus configured to:
   determine one or more network characteristics corresponding to network communications between a first storage array and a second storage array;
   analyze one or more network metrics of at least one acknowledgment communication from the second storage array to the first storage array; and
   based on the one or more network metrics, transmit one or more input/output (IO) messages from the first storage array to the second storage array during an acknowledgment period corresponding to receipt of the at least one acknowledgment communication from the second storage array by the first storage array, wherein the transmitting utilizes available bandwidth capacity of a communication channel between the first storage array and the second storage array during the acknowledgment period that would otherwise remain unused while awaiting the at least one acknowledgment communication,
   wherein the transmitting includes:
       monitoring bandwidth utilization of the communication channel during the acknowledgment period,
       identifying unused bandwidth capacity that remains available while waiting for acknowledgment communications, and
       dynamically generating and transmitting additional IO messages specifically sized to utilize the identified unused bandwidth capacity without interfering with acknowledgment communications.

9. The apparatus of claim 8, further configured to:
   determining a bandwidth corresponding to the one or more network characteristics of the network communications between the first storage array and the second storage array.

10. The apparatus of claim 8, further configured to:
    determining a latency corresponding to the one or more network characteristics of the network communications between the first storage array and the second storage array.

11. The apparatus of claim 10, further configured to:
    determining an impact of network distance between the first storage array and the second storage array on the latency.

12. The apparatus of claim 11, further configured to:
determining the network distance between the first storage array and the second storage array based on a round-trip time (RTT) of the one or more IO messages.

13. The apparatus of claim 9, further configured to:
predicting a utilization of the bandwidth during a future acknowledgment period; and
determining an available bandwidth capacity during the future acknowledgment period based on the utilization of the bandwidth.

14. The apparatus of claim 13, further configured to:
generating a set of IO messages to fill a portion of the available bandwidth capacity during the future acknowledgment period; and
transmitting the set of IO messages from the first storage array to the second storage array during the future acknowledgment period.

15. A non-transitory computer-readable medium including instructions that, when executed by a processor, causes the processor to:
determine one or more network characteristics corresponding to network communications between a first storage array and a second storage array;
analyze one or more network metrics of at least one acknowledgment communication from the second storage array to the first storage array; and
based on the one or more network metrics, transmit one or more input/output (IO) messages from the first storage array to the second storage array during an acknowledgment period corresponding to receipt of the at least one acknowledgment communication from the second storage array by the first storage array, wherein the transmitting utilizes available bandwidth capacity of a communication channel between the first storage array and the second storage array during the acknowledgment period that would otherwise remain unused while awaiting the at least one acknowledgment communication,
wherein the transmitting includes:
monitoring bandwidth utilization of the communication channel during the acknowledgment period,
identifying unused bandwidth capacity that remains available while waiting for acknowledgment communications, and
dynamically generating and transmitting additional IO messages specifically sized to utilize the identified unused bandwidth capacity without interfering with acknowledgment communications.

16. The non-transitory computer-readable medium claim 15, further including instructions that, when executed by the processor, cause the processor to:
determining a bandwidth corresponding to the one or more network characteristics of the network communications between the first storage array and the second storage array.

17. The non-transitory computer-readable medium claim 15, further including instructions that, when executed by the processor, cause the processor to:
determining a latency corresponding to the one or more network characteristics of the network communications between the first storage array and the second storage array.

18. The non-transitory computer-readable medium claim 17, further including instructions that, when executed by the processor, cause the processor to:
determining an impact of network distance between the first storage array and the second storage array on the latency.

19. The non-transitory computer-readable medium claim 16, further including instructions that, when executed by the processor, cause the processor to:
predicting a utilization of the bandwidth during a future acknowledgment period; and
determining an available bandwidth capacity during the future acknowledgment period based on the utilization of the bandwidth.

20. The non-transitory computer-readable medium claim 19, further including instructions that, when executed by the processor, cause the processor to:
generating a set of IO messages to fill a portion of the available bandwidth capacity during the future acknowledgment period; and
transmitting the set of IO messages from the first storage array to the second storage array during the future acknowledgment period.

\* \* \* \* \*